UNITED STATES PATENT OFFICE.

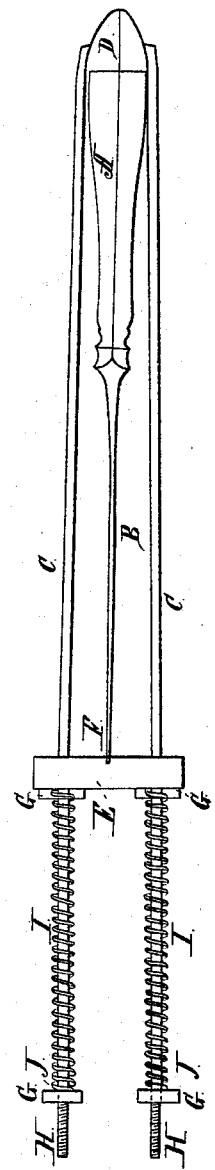

ALMON COOLEY, OF HARTFORD, CONN., ASSIGNOR TO E. W. SPERRY, J. H. ASHMEAD, E. HURLBERT, AND HENRY E. ROBBINS, ALL OF SAME PLACE.

IMPROVEMENT FOR HOLDING KNIFE-HANDLES FOR SOLDERING.

Specification forming part of Letters Patent No. 26,322, dated November 29, 1859.

*To all whom it may concern:*

Be it known that I, ALMON COOLEY, of Hartford, county of Hartford and State of Connecticut, have invented certain new and useful Improvements in Device for Securing or Holding Knife Blades and Handles, &c., for Soldering; and I do hereby declare that the same is described and represented in the following specification and drawings; and to enable others skilled in the art to make and use said improvement, I will proceed to describe its construction and operation, referring to the drawings, in which the same letters indicate like parts in each of the figures.

The nature of this improvement consists in securing the handle and blade (or whatever article it may be that is desired to be soldered to and extend from a handle) in their proper place and position, and so hold while the parts are being soldered together, by the use of spring-clamps, screw-clamps, or their equivalents, substantially as hereinafter described.

In the accompanying drawings, A is a handle. B is a blade, (or other article desired to be secured to the handle A.) C are clamp-rods connected or secured to a cap, D, (or other suitable formed or shaped device) for holding or steadying the butt-end of the handle. E is a cross-bar having holes through which the clamp-rods C may pass. Said cross-bar is designed to be made of any desirable shape, and with such openings at F as to receive, hold, and steady the end of the blade, (or other article desired to be secured to the handle A.) The said cross-bar E may be adjusted to fit the length of the article to be soldered by means of the nuts G, or their equivalents, by having the screw H cut down on the rods C to the required distance. I are spiral springs, placed upon the rods C, one end of which rest against the cross-bar E and the other end against the nuts G or pins J. The same result may be produced by securing springs, something of the elliptic form, on the cross-bar and taking their bearing under the nuts or pins G J, or their equivalents.

There are various ways of making these clamps for the purpose specified, but the object of this improvement is to avoid the old and tedious way of wiring, which is found by a careful estimate will take ten hours to wire one gross of blades to the handles and four hours to solder them, (making fourteen hours,) which by this improvement the same amount (one gross) can be soldered (without wiring at all) with greater ease and with saving of stock and far better work in four hours.

The end of the handle and blade (or other article) to be soldered together is first prepared so that the parts put together will form a good joint for soldering. The handle and blade, &c., is then placed between the cap D and the cross-bar E, as aforesaid, or their equivalents, (the solder used for the purpose, whether hard or soft, being applied much in the usual way.) Now it will be noticed that if the cross-head E were secured by the nuts G or other device directly at the end of the blade, &c., the heat of the blaze will expand the rods about in proportion with the blade and handle, &c.; but if one side should expand more than the other it would be likely to disturb the proper position of the blade, &c., to the handle. I therefore think the use of springs in some form are desirable and better adapted for this purpose.

I believe I have thus described the nature, construction, and operation of my improvement, together with some of the advantages to be derived over the old way of wiring, so as to enable others skilled to make and use the same.

What I claim, therefore, and desire to secure by Letters Patent, is—

The above-described device for holding knife blades, handles, &c., for soldering together, or their substantial equivalents, the rods C, cap D, bar E, springs I, operating in the manner substantially as set forth, for the purpose specified.

ALMON COOLEY. [L. S.]

Witnesses:
SAML. I. TUTTLE,
JEREMY W. BLISS.